United States Patent [19]

Benham

[11] Patent Number: 5,377,328
[45] Date of Patent: Dec. 27, 1994

[54] TECHNIQUE FOR PROVIDING IMPROVED SIGNAL INTEGRITY ON COMPUTER SYSTEMS INTERFACE BUSES

[75] Inventor: John R. Benham, Sterling, Mass.

[73] Assignee: Data General Corporation, Westboro, Mass.

[21] Appl. No.: 710,655

[22] Filed: Jun. 5, 1991

[51] Int. Cl.⁵ .................. G06F 13/20; G06F 13/38
[52] U.S. Cl. ..................... 395/250; 395/275; 395/325; 395/575; 364/240; 364/239; 364/239.7; 364/DIG. 1; 364/285
[58] Field of Search ............. 395/250, 275, 325, 575; 307/268, 106, 108, 234, 263, 490

[56] References Cited

U.S. PATENT DOCUMENTS

| | | | |
|---|---|---|---|
| 3,832,572 | 8/1974 | Minamihata et al. | 307/106 |
| 4,272,809 | 6/1981 | Kadowaki | 364/900 |
| 4,454,591 | 6/1984 | Lou | 364/900 |
| 4,466,079 | 8/1984 | Daniels et al. | 364/900 |
| 4,484,263 | 11/1984 | Olson et al. | 364/200 |
| 4,571,671 | 2/1986 | Burns et al. | 364/200 |
| 4,682,045 | 7/1987 | Amazawa et al. | 307/125 |
| 4,788,638 | 11/1988 | Ogawa et al. | 364/200 |
| 4,860,244 | 8/1989 | Bruckert et al. | 364/900 |
| 5,003,463 | 3/1991 | Coyle et al. | 364/200 |
| 5,039,887 | 8/1991 | Brahms et al. | 307/490 |
| 5,077,656 | 12/1991 | Waldron et al. | 395/325 |
| 5,088,025 | 2/1992 | Fujimoto | 395/275 |
| 5,097,410 | 3/1992 | Hester et al. | 395/275 |
| 5,121,485 | 6/1992 | Ujiie | 395/325 |
| 5,134,308 | 7/1992 | Boemi | 307/263 |

OTHER PUBLICATIONS

American National Standard For Information Systems X3.131–1986 "Small Computer System Interface (SCSI)".
The SCSI Bus (Parts 1 and 2)—Feb. and Mar. 1990—L. Brett Glass.
OEMs terminate SCSI woes by Terry Costlow, Apr. 1, 1991—Electronic Engineering Times.

Primary Examiner—Gopal C. Ray
Attorney, Agent, or Firm—Robert F. O'Connell; Kevin J. Fournier

[57] ABSTRACT

An interface system for transmitting a pulse waveform signal between a host computer and a plurality of peripheral units wherein such signal is transmitted on a dedicated bus, the peripheral units being connected to the bus in selected groups thereof. Each group has a buffer unit connected between the group of units and the host unit, the buffer unit including circuitry for providing signal transmission in only one direction, for controlling the final signal level of the signal, and for controlling the slope of the trailing edge of the signal so that signal degradation is minimized.

10 Claims, 3 Drawing Sheets

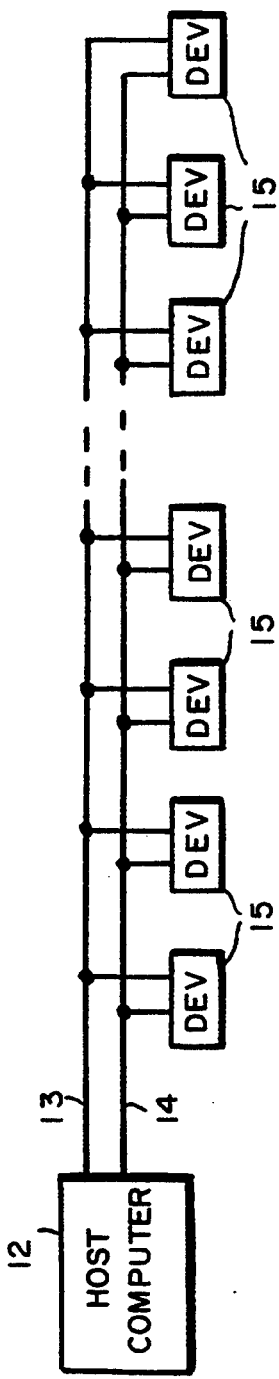
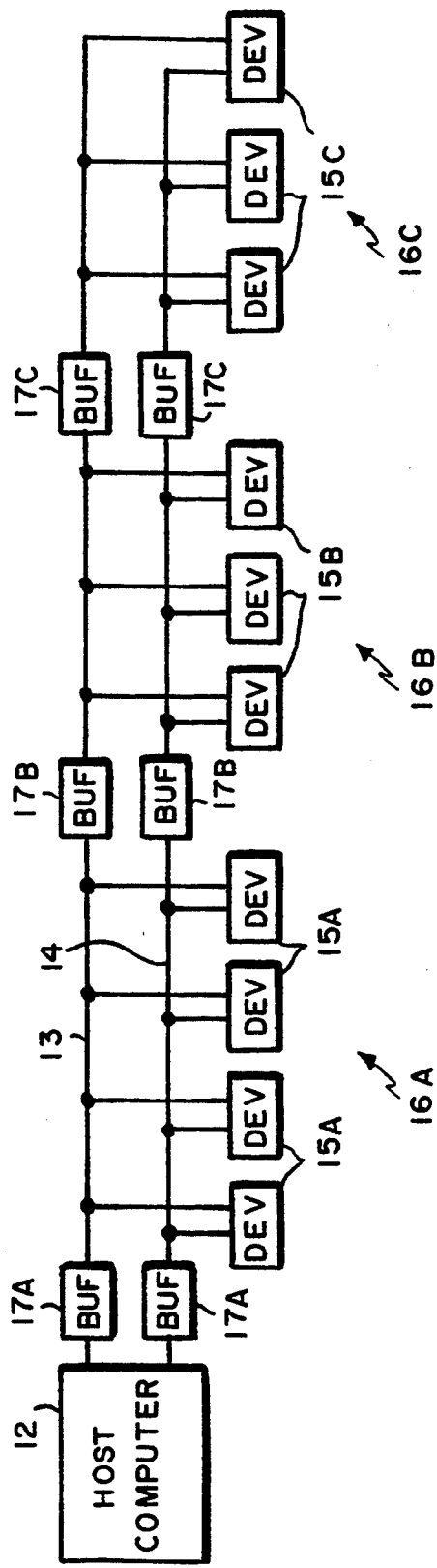

TECHNIQUE FOR PROVIDING IMPROVED SIGNAL INTEGRITY ON COMPUTER SYSTEMS INTERFACE BUSES

INTRODUCTION

This invention relates generally to computer interface bus systems which are used in interfacing host computers with a plurality of peripheral devices and which have certain operating constraints imposed on them, and, more particularly, to a technique for preserving the integrity of signals, such as certain control signals, being transmitted on dedicated ones of such bus systems, such signals often tending to become degraded during transmission as a result of the imposed constraints.

BACKGROUND OF THE INVENTION

In certain bus systems used to interface a host computer with a number of peripheral devices or units, signal degradation may occur, particularly with respect to certain control signals transmitted between the host unit and the peripheral units each of which signals is often transmitted on its own dedicated control signal bus. Such signal degradation tends to occur during transmission on such buses because of multiple signal reflections due to impedance mis-matches which occur on the bus due to the variations in the input capacitances from peripheral unit to peripheral unit present on the bus. Such effects are particularly noticeable when the bus is relatively heavily loaded, i.e., there are a relatively large number of peripheral units which act to produce an excessive load on the bus. Further, signal degradation is further aggravated because the signal rise times at the host unit and at the peripheral units are often essentially incompatible.

For small computer systems, for example, the American National Standards Institute (ANSI) issues specifications requiring certain standardized operating characteristics for Small Computer System Interfaces (SCSI), i.e., small computer bus systems. Under current industry bus specifications imposed on such bus interfaces, for example, relatively low maximum current carrying or current sink capabilities from devices driving a bus are permitted. Further, earlier specifications imposed no limits on the input capacitances of the peripheral devices used and, although more recent specifications did impose a maximum permissible input capacitance, the limit was set at a relatively high level so that peripheral device manufacturers produce units which still have relatively high input capacitances which differ from product to product. Such relatively high and different input capacitances tend to produce signal degradations due to signal reflections, the severity of the reflections effects depending on both the number and the locations of the devices on the bus.

Further, such specifications require that the total length of the bus and cabling to the peripheral devices be limited to a maximum limit. Under such conditions reasonably reliable bus transmission performance can be expected only if the peripheral devices on the bus are fairly widely spaced apart along the bus.

However, in many applications it is desired to reduce such spacing as much as possible so that a relatively large number of peripheral devices can be used while still maintaining the total bus and cable lengths below the imposed limit thereon. A reduction in spacing may also be desired even with relatively fewer peripheral units in order to provide a desired physical packaging configuration of the units in the overall computer system. Such reduction in spacing, however, tends to aggravate the signal degradation.

Most suggestions for preventing signal degradation under such conditions have involved attempts to provide specially designed impedance terminations at either or both ends of an interface bus system in an effort to reduce the effect of undesired reflections along the bus and to provide an effective overall impedance match in the light of the driver current sink constraint and the lack of any severe constraint on the maximum permissible peripheral unit capacitances in the system. Other suggestions have included a reduction in the normal impedance characteristics of the peripheral cables used to interconnect the peripheral units to the bus and/or of the internal ribbon cables used in the units themselves. Still another suggestion has been to use lossy resistive elements (e.g., ferrite beads) between the bus and a target peripheral unit so as to adjust the input impedance presented to the bus by the unit in order to reduce the loading effects of the unit on the bus.

None of such approaches have proved beneficial in avoiding signal degradation, particularly in avoiding the "notch" effect which is often produced in the control signal being transmitted along the bus and which has a detrimental effect on computer operation, as discussed in more detail below.

It is desired, therefore, to provide an interface system in which peripheral units having a relatively wide variety of relatively high input capacitances can be accommodated, in which the spacings between peripheral units can be made relatively short, if desired, and in which such units can be placed arbitrarily at any position, or "slot", on the bus while minimizing signal degradations. It is further desirable that the signal rise times be appropriately controlled so that, when the rise times among peripheral units and the host are essentially incompatible, the introduction of further signal degradation can be avoided. Such an improved bus interface system should be designed to operate reliably within the industry bus characteristic and bus/cable length standards imposed on such systems.

BRIEF SUMMARY OF THE INVENTION

In accordance with the invention, if the number of peripheral units used on the bus is relatively large, it is desirable to treat the overall bus system effectively as comprising one or more bus subsystems, each of which includes a cluster, or group, of a limited number of peripheral units. Each cluster of peripheral units then utilizes a buffer unit positioned on the bus between the cluster of units and the host computer. The buffer unit comprises a circuit which causes the buffer to operate as a non-reciprocal device wherein transmission of a signal therethrough occurs in only one direction. Further, the circuitry thereof is arranged so that the signal pull-up or pull-down, which normally occurs at the trailing edge of a signal which is being transmitted on the bus, depending on how the signal is being asserted, operates so as to pull the signal to a voltage level sufficiently above, or below, a threshold voltage level so that the presence of any "notch" effects has substantially little or no effect on the desired transmission characteristics of the signal. Further, the circuit is designed so that the rise, or fall, time, i.e., the slope, of the trailing edge of the signal is controlled so as to effectively eliminate or substantially reduce the notch effect which often tends to occur, particularly when the rise, or fall, time of the signal is too rapid, i.e., its slope is too steep. Moreover, the circuit is designed so as to provide an input hysteresis effect so that the buffer is sufficiently tolerant of adverse signal waveforms at its input to still produce a correct output level.

By arranging the circuitry of each buffer unit associated with a cluster of peripheral devices so as to provide the desired non-reciprocal circuit operation, to provide a sufficiently high pull-up, or pull-down, voltage level, and to provide a controlled signal rise, or fall, time, signal degradation is prevented even when using a bus system operating under industry standards imposed thereon with respect to the driver current sink capabilities and permissible peripheral device input capacitance values.

DESCRIPTION OF THE INVENTION

The invention can be described in more detail with the help of the accompanying drawings wherein:

FIGS. 1 and 1A depict idealized waveforms of a typical signal, respectively, without and with a typical signal degradation present therein;

FIG. 2 depicts in block diagram form a typical exemplary bus interface system for providing signal communication between a host computer and a plurality of peripheral devices;

FIG. 3 depicts in block diagram form an exemplary bus interface system in accordance with the invention;

Figure 4:
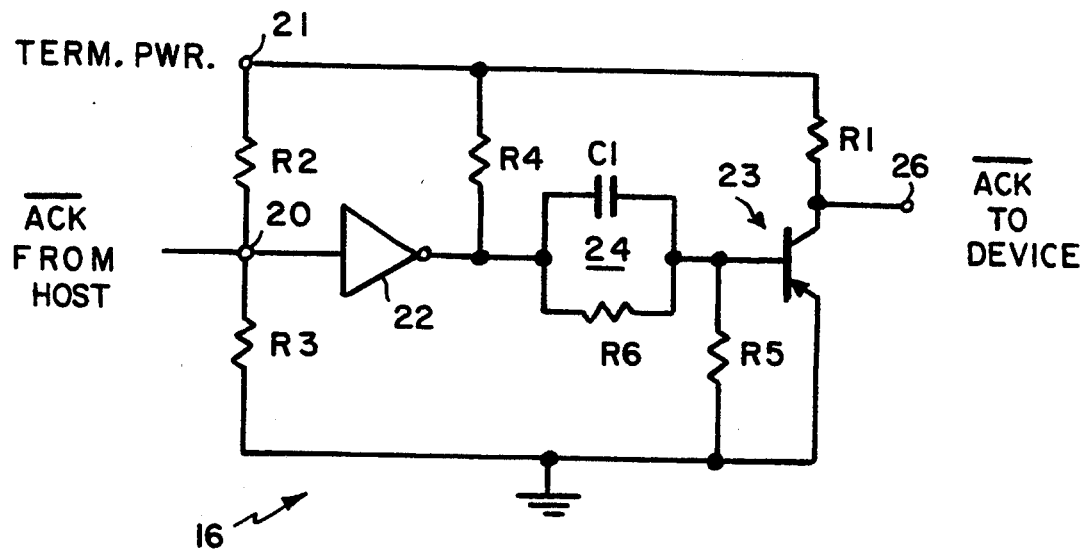
FIG. 4 depicts an exemplary buffer unit used with a cluster of peripheral units on a bus which transmits an exemplary control signal from the host computer to the peripheral units of the system of FIG. 3.

In using certain designated bus systems for transmitting certain selected control signals between a host computer and a plurality of peripheral devices or units (e.g., memory units, such as disc driven and tape driven devices, printer devices, image scanning devices, display units, and the like) the signal being transmitted often suffers signal degradation due to undesired reflections which occur at certain points along the bus as the signal is being transmitted, normally due to impedance mis-matches at such points, and also due to the use of signal rise or fall times that are too fast, i.e., trailing edge slopes that are too steep. Such difficulties often result in the presence of a "notch" effect in the signal waveform as shown in the highly idealized signal waveform 10 of FIG. 1.

As seen therein, a typical signal is often asserted by being "pulled down" from a nominal "high" signal level, $V_{oh}$, to a nominal "low" signal level, $V_{ol}$, for a specified time period after which the signal is then "pulled up" to its $V_{oh}$ level. Two typical control signals used in many computer systems are the request or $\overline{REQ}$ signal and the acknowledge or $\overline{ACK}$ signal. The "bar" symbol used with each signal designation is normally used to show that the signal is asserted by being pulled down from its higher $V_{oh}$ level to its lower $V_{ol}$ level.

The presence of the $\overline{REQ}$ signal may signify in various possible protocols, that the peripheral device has placed valid data on the data bus lines, or that the peripheral device is ready for the host to place data on the bus, or as a marker to allow the host to recognize and count each element of data as it is placed on the bus by the peripheral, or as an event indicating an increase in the number of data elements received by the peripheral from the host.

In a complimentary manner, the assertion of the $\overline{ACK}$ signal signifies variously that the host has received a data element from the peripheral, or that it has placed data on the bus, or as a marker to allow the peripheral to recognize and count each element of data as it is placed on the bus by the host, or as an event indicating an increase in the number of data elements received by the host from the peripheral.

In all protocols the receiving device is edge-sensitive to the voltage on the REQ or ACK line in that the receiver senses the change in voltage from $V_{oh}$ to $V_{ol}$ or vice versa by comparing it with a critical threshold voltage in the range of $V_{ol}$ to $V_{oh}$.

Due to the presence of mis-matched impedance characteristics on the bus and the steep rise time which may occur on the signal's trailing edge (when it is being pulled up), the signal often has an undesired notch therein which occurs shortly after signal pull-up from a low level to a high level, as shown by notch 11 in idealized waveform 10 of FIG. 1A. If the depth of the notch 11 is below a threshold level $V_{th}$ the signal mistakenly appears to have been asserted a second time. Such a spurious second assertion may cause the initial portion of the data stream being transmitted on the data bus to be mistakenly accepted a second time, thereby adversely altering the desired data stream on the data bus and causing an undetectable error therein. It is, therefore, desirable to substantially reduce or eliminate the notch effect which occurs at pull-up so as to avoid having the notch level drop to a point below the threshold level once the signal assertion has already been completed.

FIG. 2 shows a typical, exemplary bus system in which the invention can be used wherein a host computer 12 is connected to a first dedicated bus 13 and a second dedicated bus 14 on which appropriate control signals are transmitted between the host unit and a plurality of peripheral devices 15 also connected to both buses 13 and 14. In a typical system, for example, bus 13 is used by the peripheral devices to transmit a bus request ("$\overline{REQ}$") signal while bus 14, for example, is used to transmit an acknowledge ("$\overline{ACK}$") signal.

In conventional systems, such as shown in FIG. 2, certain constraints are imposed on the operating characteristics of the buses 13 and 14 and the units thereon. As mentioned above, one limitation involves the maximum current sink capability permitted when a unit drives the bus wherein a current sink limit of 48 mA., for example, is imposed by the American National Standards Institute (ANSI) in accordance with its standard specifications for Small Computer System Interface buses (SCSI I and SCSI II) specifications. Another standard involves a maximum permissible input capacitance for peripheral devices which are placed on a bus, e.g., the ANSI SCSI I specification imposes no limits thereon, while SCSI II imposes an input capacitance limit of 25 pF. No signal rise or fall time limits are imposed under either specification. When such standards and the effects of transmission line behavior of a bus system are taken into account, it has been found that reliable signal transmission performance is achievable only if the peripheral devices used on the bus are relatively widely spaced apart along the length of the bus, e.g., at least 12 inches apart, for example, as recommended under both ANSI SCSI standards. If such devices are more closely spaced, such standards make it difficult to provide appropriate impedance matching at each device and undesired reflections can arise which produce signal notch effects as discussed above. In addition, it has been found that if the rise times at the trailing (pull-up) edge of a control signal on the bus are too fast, the notch effect is further aggravated.

In order to avoid the problems which arise because of the signal degradations which produce such notch effects, the invention described herein arranges the peripheral devices into appropriate groups thereof, each group, or cluster of devices on the bus operating as an effective bus sub-system. In accordance with the invention, each cluster of peripheral devices has a buffer unit positioned on the bus between the cluster of devices and the host unit. In an exemplary system shown in FIG. 3, a first cluster 16A includes a number of devices 15A connected to buses 13 and 14 and a buffer unit 17A is connected in series with each bus between the cluster 16A and host computer 12. A buffer unit 17B is connected on each bus between a cluster 16B of devices 15B and host computer 12 and a buffer unit 17C is connected on each bus between a cluster 16C of devices 15C and host computer 12, and so on, depending on how many device clusters are used with buses 13 and 14.

In each case the buffer unit 16 comprises a circuit which operates as a non-reciprocal circuit, which has a relatively high pull-up voltage, and which includes circuit elements for controlling the rise times at the trailing edge of the signal being transmitted thereon, such characteristics thereby eliminating or substantially reducing the notch effect in the signal involved.

A particular embodiment of such a buffer unit circuitry for use on bus 13 which in the embodiment discussed carries an ACK signal from a host to a peripheral unit is shown by the circuit of FIG. 4. As seen therein, a signal input terminal 20 is connected to the $\overline{ACK}$ signal line from host computer 12. An input impedance termination network comprising resistors R2 and R3 is used in the circuit, R2 being connected from input terminal 20 to a pull-up voltage source at terminal 21 and R3 being connected from input terminal 20 to ground. A non-reciprocal amplifier 22 with hysteresis is connected from input terminal 20 to the base of an output transistor 23 via an R-C circuit 24. The non-reciprocal nature of the buffer unit prevents the propagation on the line of any backward reflections which may arise when the $\overline{ACK}$ signal is transmitted from the cable connected between the bus and the peripheral unit to the low impedance environment created by the components which are present in the peripheral unit. The collector of transistor 23 is connected to the bus at terminal 26 for supplying the ACK signal to one of the peripheral devices of a cluster thereof associated with the buffer circuit (as shown in FIG. 3). Transistor base resistor R5 is connected to ground as is the emitter of transistor 23. An output resistor R4 of amplifier 22 is connected to the pull-up voltage source as is the output pull-up resistor R1 at the collector of transistor 23. The time-constant of R-C circuit 24 is determined by the values of resistor R6 and capacitor C1.

In a particular preferred embodiment of the circuit configuration of FIG. 4 which has been found useful in providing the operation required to substantially reduce or eliminate ACK signal degradation, especially with respect to the notch effect thereon, the components have been selected to have the following values:
R1=110 ohms
R2=220 ohms
R3=330 ohms
R4=360 ohms
R5=2.2 Kohms
R6=330 ohms
C1=22 pF.

The amplifier 22 is a Schmitt trigger amplifier having a model designation 74F14, well-known to those in the art, as sold, for example, by many manufacturers, and the transistor 23 has a model designation 2N2369, also well-known to those in the art, as made and sold by many transistor manufacturers.

The pull-up voltage line is connected to a voltage source having a nominal voltage level of 5.0 volts, such as from a suitable terminal power source readily available on substantially all computer systems. Buffer unit 16 operates in a non-reciprocal manner, transmitting only in a direction from its input terminal 20 to its pull-up collector output terminal 26. Moreover, the circuit is designed to use a nominal pull-up voltage of 5.0 volts, which is higher than the normal pull-up voltage level of 2.6 to 3.2 volts used with conventional control signals of the type discussed here. The use of such higher voltage tends to bring any notch that may be present in the signal to a level well above the threshold voltage. Such level will normally prevent the notch from extending below the threshold level. In some cases, however, the notch may be too deep for the higher voltage pull-up level to overcome the extension thereof below the threshold level. In order to further prevent such occurrence, the circuit of FIG. 4 is provided with R-C circuit 24, the time constant of which is arranged to control the signal trailing edge rise time so as to produce a relatively slower rise time at the pull-up edge then may normally be present in the signal being transmitted. It is found that the use of such R-C circuit to provide a controlled rise time can in most cases effectively eliminate the notch altogether. Moreover, since the input capacitance of the buffer unit is very small (e.g., 5–7 pF.) the presence of the buffer itself does not give rise to any reflection problems.

Figure 6:
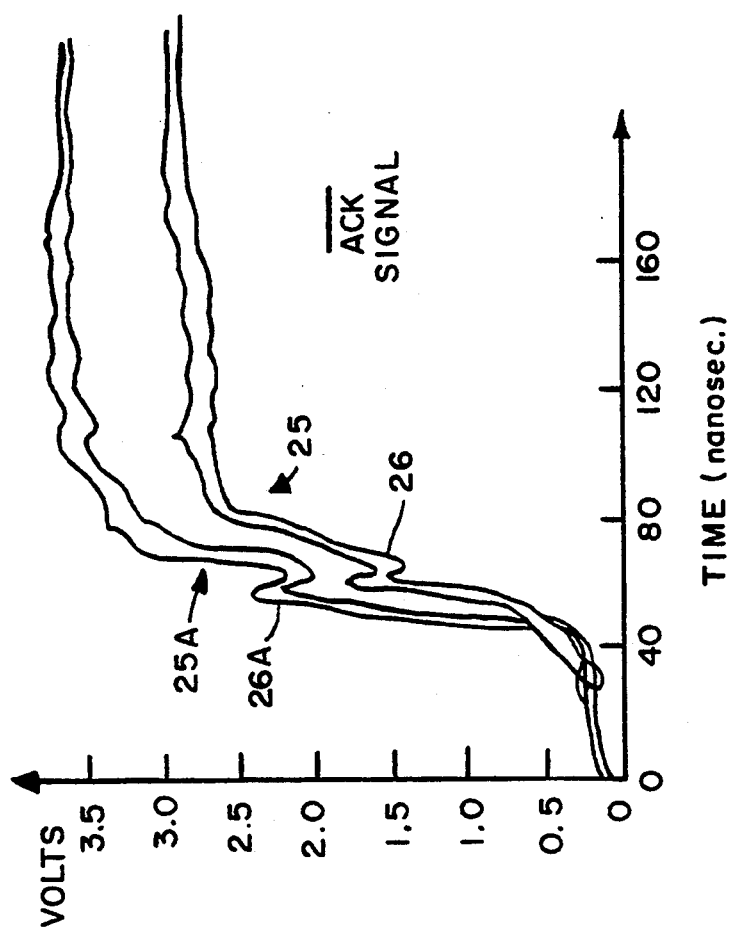
FIG. 6 depicts a comparison of actual representative exemplary signal waveforms with and without the use of a buffer unit of the invention shown in FIG. 4.

FIG. 6 demonstrates a comparison of a representative $\overline{ACK}$ control signal 25, when transmitted on a typical dedicated bus from a host to a peripheral unit without the use of a buffer unit, with an $\overline{ACK}$ control signal 25A, when transmitted on such bus when a buffer unit 16 as shown in FIG. 4 is used with a cluster of devices. The $\overline{ACK}$ signal 25 has a severe notch 26 which occurs at a relatively low voltage level, e.g., between about 1.3 to 1.8 volts in the particular example depicted, after signal pull-up from its "low" voltage $V_{ol}$ (near zero volts) to its "high" voltage $V_{oh}$ between about 2.5 and 2.8 volts. In contrast, the notch 26A in $\overline{ACK}$ signal 25A occurs at a significantly higher voltage level, e.g., above 2.0 volts, which is well above a threshold level at which it will have any adverse effect on the signal.

Figure 5:
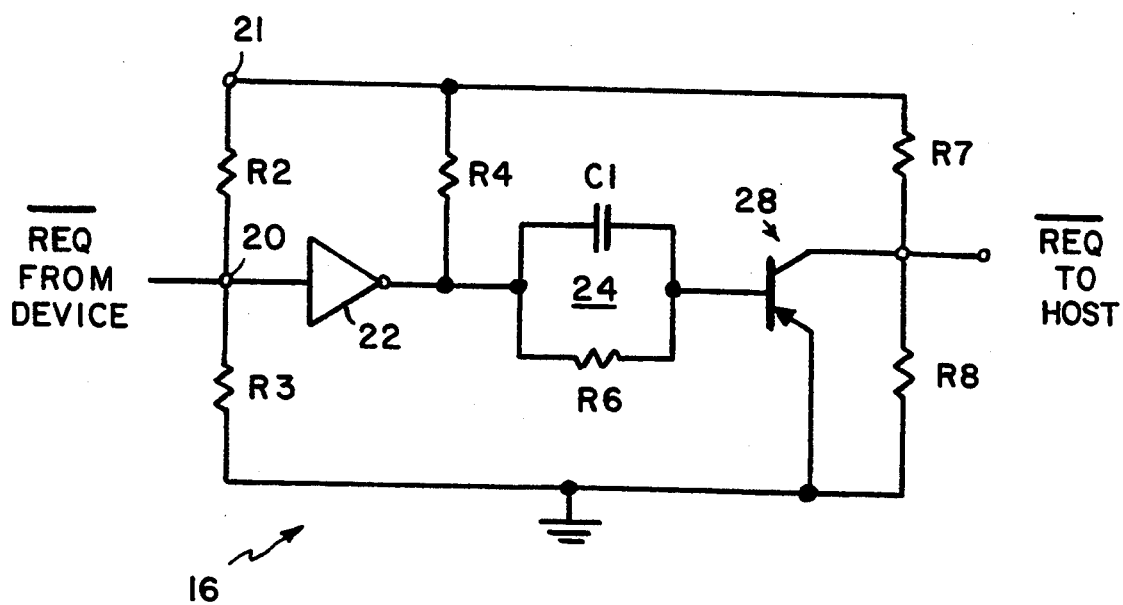
FIG. 5 depicts an exemplary buffer unit used with a cluster of peripheral units on a bus which transmits an exemplary control signal from the peripheral units to the host computer of the system of FIG. 3.
Figure 7:
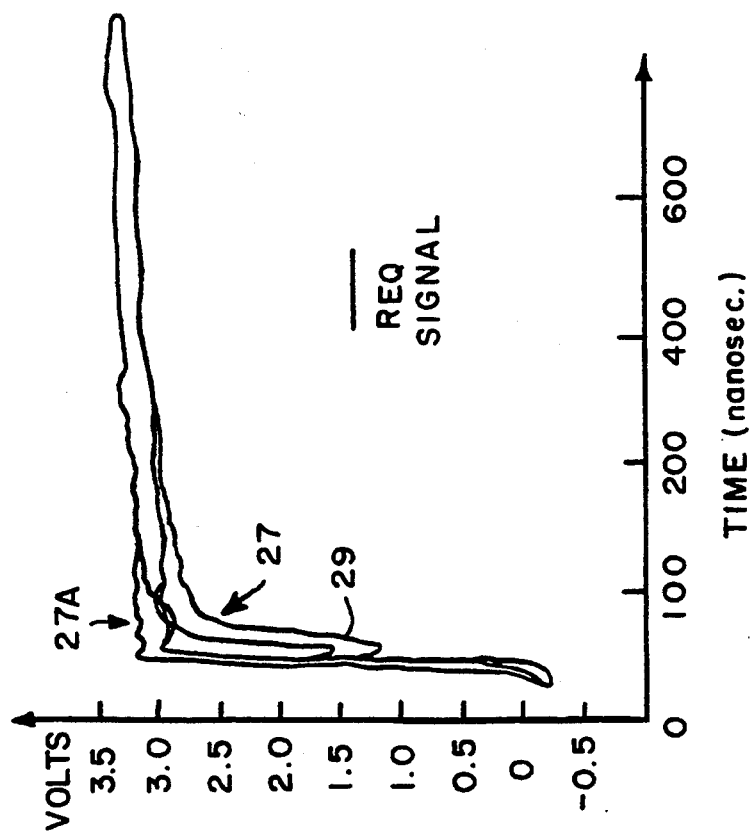
FIG. 7 depicts a comparison of actual representative exemplary signal waveforms with and without the use of a buffer unit of the invention shown in FIG. 5.

FIG. 5 shows a specific circuit of a buffer unit 16 which is used with each cluster of peripheral devices on the request control bus 14, on which bus request ($\overline{REQ}$) signals are transmitted from the peripheral devices to the host. Such buffer circuit is substantially similar to that of the buffer circuit of FIG. 4 except that the output is supplied from an open collector transistor 28 which is supplied to an output voltage-divider termination network comprising resistors R7 (of 220 ohms) and R8 (of 330 ohms) at the host end of the buffer. An open collector is used since any device must be able to assert a REQ signal. In a manner similar to that of buffer 16 used with the ACK control bus, a comparison of a typical REQ signal, without and with the buffer unit on the REQ bus, is shown by REQ signals 27 and 27A, respectively, in FIG. 7. In signal waveform 27A the notch 29, present in waveform 27 at a voltage level between about 1.3 to 1.8 volts, is found to be effectively eliminated and the general signal waveform of signal 27A, with the buffer 16, produces no adverse effect on the signal. The use of the 220 ohms/330 ohms terminations at the input and output ends of the buffer permits the buffer to operate within the drive current sink constraints imposed on the bus.

The use of a buffer unit with each cluster of peripheral devices, on either the ACK bus for transmitting signals from the host to a peripheral unit or the REQ bus for transmitting signals from a peripheral unit to the host, provides a considerable improvement in the signal waveform being transmitted and prevents the occurrence of any problems which often arises due to the presence of a notch following the non-assertion of the signal being transmitted. The buffer can be readily added to the bus lines involved as a relatively small, in-line module using appropriate connectors and the presence thereof does not introduce any significant signal propagation delays in transmission (e.g., only about 10 nsec. or less per module).

While the invention has been described as particularly effective when used to prevent signal degradation in conventional ACK and REQ signals of a computer system, the inventive concepts may also be found useful in preventing signal degradation of other signals that may be transmitted on dedicated buses which introduce undesirable signal reflections and impedance mis-matches during signal transmission and where irreconcilable electrical incompatibilities exist between the electrical parameters of the transmitting and receiving devices.

Moreover, the specific resistance and capacitance values and the particular amplifier and transistor types specified in the embodiments described are exemplary only and other values and other amplifier and transistor components may be used by those in the art depending on the particular context in which the buffer circuitry is being used.

Hence the invention is not to be construed as limited to the particular embodiments described above and variations therein will occur to those in the art within the spirit and scope of the invention. Accordingly, the invention is not to be interpreted as limited to the particular embodiments disclosed, except as defined by the appended claims.

What is claimed is:

1. An interface system for transmitting operation control signals in a selected direction between a host computer unit and a plurality of peripheral units, said operation control signals having a pulse waveform the trailing edge of which returns to a selected final signal level, said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected directions, said circuitry including means responsive only to an operation control signal supplied thereto for amplifying said operation control signal to control the final signal level of said operation control signal, and means for controlling the slope of the trailing edge of said operation control signal, and said circuitry being arranged to have a substantially small input capacitance.

2. An interface system for transmitting operation control signals in a selected direction between a host computer unit and a plurality of peripheral units, said operation control signals having a pulse waveform the trailing edge of which returns to a selected final signal level, said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected direction, said circuitry including means responsive only to an operation control signal supplied thereto for amplifying said operation control signal to control the final signal level of said operation control signal, and means for controlling the slope of the trailing edge of said operation control signal, and said circuitry being arranged to introduce a substantially small propagation delay of an operation control signal being transmitted through said buffer unit.

3. An interface system for transmitting operation control signals in a selected direction between a host computer unit and a plurality of peripheral units, said operation control signals having a pulse waveform the trailing edge of which returns to a selected final signal level, said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected direction, said circuitry including means responsive only to an operation control signal supplied thereto for amplifying said operation control signal to control the final signal level of said operation control signal and means for controlling the slope of the trailing edge of said operation control signal, and said circuitry including an input resistance network connected to said bus means for responding to an operation control signal to be transmitted through said buffer unit;

a non-reciprocal amplifier connected to said input resistance network for amplifying the pulse waveform of said operation control signal;

a resistance-capacitance circuit being connected to said non-reciprocal amplifier and having a selected time constant for controlling the slope of the trailing edge of said amplified pulse waveform; and a transistor output circuit connected to said resistance-capacitance circuit for supplying said amplified pulsed waveform signal at the collector thereof, the voltage at said collector being arranged to have a sufficiently high level so as to cause the signal pulse waveform to return to a final signal level which is substantially beyond said selected threshold level.

4. An interface system in accordance with claim 3 wherein said transistor output circuit acts as an open collector circuit, the collector being connected to an output resistance network.

5. An interface system in accordance with claim 3 wherein the collector of said transfer output circuit is connected to voltage source via a collector resistance.

6. An interface system for transmitting operation control signals in a selected direction between a host computer unit and a plurality of peripheral units, said operation control signals having a pulse waveform the trailing edge of which returns to a selected final signal level said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected direction, said circuitry including means responsive only to an operation control signal supplied thereto for amplifying said operation control signal to control the final signal level of said operation control signal and means for controlling the slope of the trailing edge of said operation control signal, and wherein said system includes a plurality of groups of said peripheral units, each group having said buffer unit connected at the host computer side of its associated group of peripheral units.

7. An interface system for transmitting operation control signals in a selected direction between a host computer unit and a plurality of peripheral units, said operation control signals having a pulse waveform the trailing edge of which returns to a selected final signal level, said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected direction, said circuitry including means responsive only to an operation control signal supplied thereto for amplifying said operation control signal to control the final signal level of said operation control signal and means for controlling the slope of the trailing edge of said operation control signal, and wherein each said operation control signal pulse waveform is such that the signal level thereof varies between a high signal and a low signal, the trailing edge of said operation control signal being returned from said low signal level to a high final signal level in a pull-up signal operation.

8. An interface system in accordance with claim 7 wherein said high signal level is substantially higher than said selected threshold signal level.

9. An interface system for transmitting operation control signals in a selected direction between a host computer unit and a plurality of peripheral units, said operation control signals having a pulse waveform the trailing edge of which returns to a selected final signal level said interface system comprising:

bus means connected to said host computer unit and to said plurality of peripheral units, said peripheral units being arranged for connection to said bus means in selected groups thereof;

a buffer unit connected between and in series with said bus means and host computer unit, said buffer unit including circuitry for providing for the transmission of said operation control signals therethrough in a said selected direction, said circuitry including means responsive only to an operation control signal supplied thereto for amplifying said operation control signal to control the final signal level of said operation control signal and means for controlling the slope of the trailing edge of said operation control signal, and wherein said system includes a plurality of bus means connected between said host computer unit and said groups of peripheral units, at least one of said bus means transmitting a first operation control signal from said peripheral units to said host computer unit and at least one of said bus means transmitting a second operation control signal from said host unit to said groups of peripheral units.

10. An interface system in accordance with claim 9 wherein each said first operation control signal is a request signal and each said second operation control signal is an acknowledge signal.

* * * * *